Oct. 19, 1965    J. A. FRAUENHEIM    3,212,186
GRASS CATCHER FOR GRASS SHEARS
Filed Jan. 13, 1964
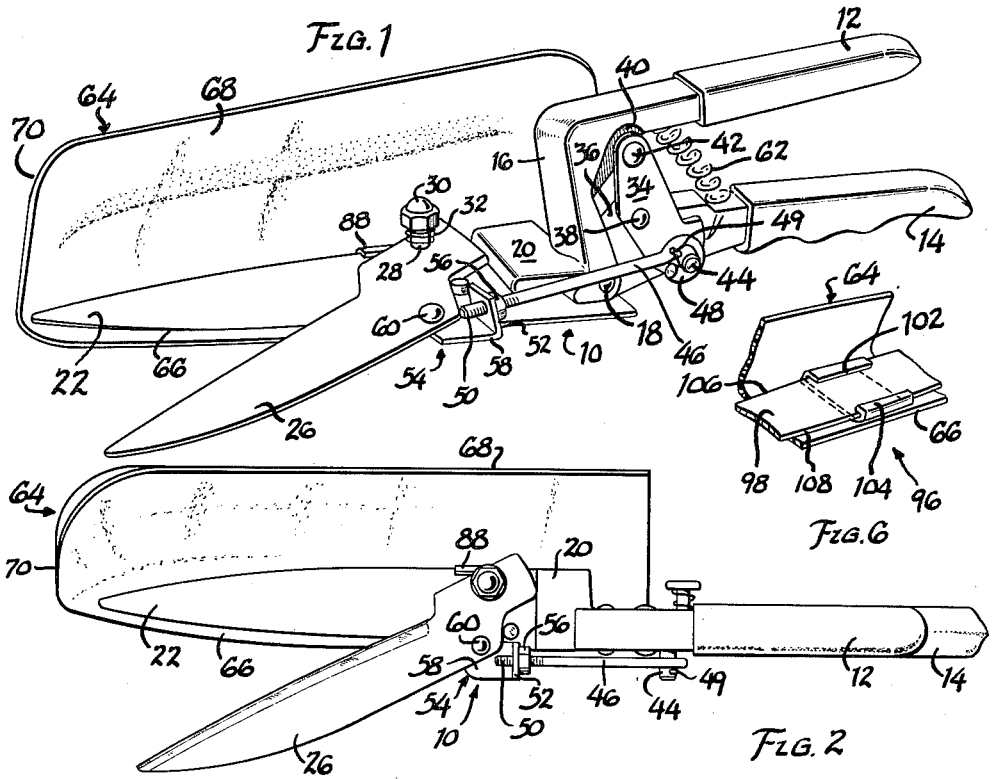
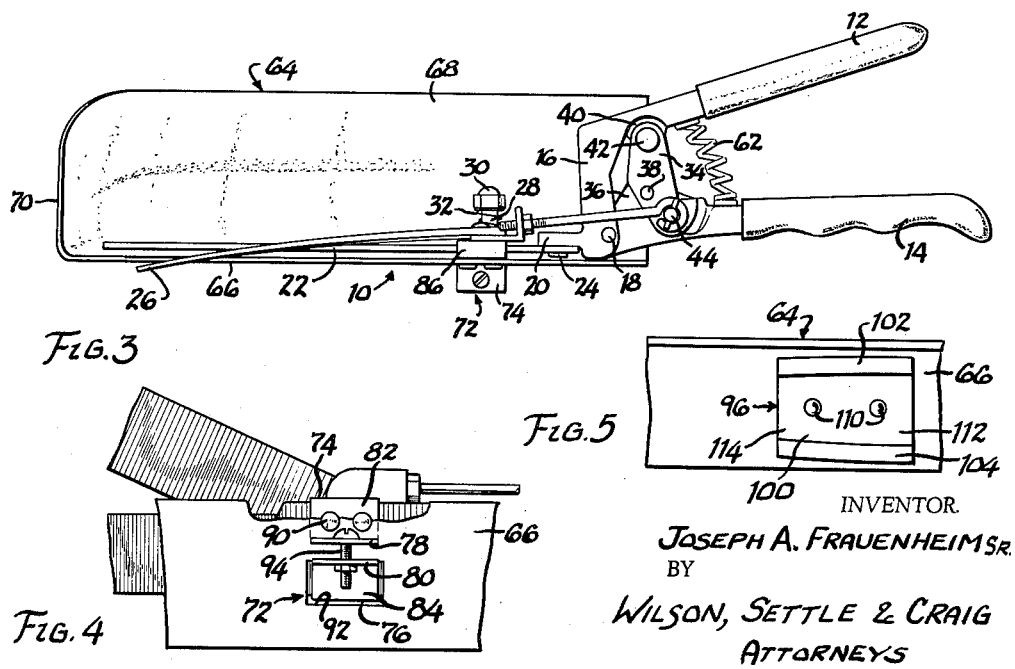
INVENTOR.
JOSEPH A. FRAUENHEIM SR.
BY
WILSON, SETTLE & CRAIG
ATTORNEYS

United States Patent Office 3,212,186
Patented Oct. 19, 1965

3,212,186
GRASS CATCHER FOR GRASS SHEARS
Joseph A. Frauenheim, Sr., 2024 Hawthorne,
Grosse Pointe Woods, Mich.
Filed Jan. 13, 1964, Ser. No. 337,460
2 Claims. (Cl. 30—131)

The present invention relates to a grass catcher for grass shears, and more particularly to a grass catcher adapted to be mounted on the fixed blade of grass shears of the type having one movable blade and one fixed blade.

Grass shears having one movable blade and one fixed blade have recently become popular for trimming the edges of lawns adjacent to driveways, sidewalks, flower beds and the like. One problem which has been encountered in the use of such shears is the portions of the cut grass are deposited on the driveway or other adjacent area, requiring subsequent sweeping in order to achieve a neat appearing yard. The present invention provides a grass catcher which is mountable on the fixed blade of conventional grass shears, the grass catcher preventing depositing of grass in the area adjacent to the lawn.

It is therefore an object of the invention to provide a grass catcher mountable on the fixed blade of grass shears having one movable blade and one fixed blade.

Another object of the invention is to provide a grass catcher having mounting means for securement to the fixed blade at a point adjacent the shear handles and beyond the cutting edges of the blades.

Another object of the invention is to provide a grass catcher fabricated from plastic, aluminum or other lightweight material which results in a lightweight, durable and inexpensive product.

A further object of the invention is to provide mounting means for the grass catcher which are adjustable to fit blades of different widths.

Other objects of this invention will appear in the following description and appended claims, reference being had to the accompanying drawings forming a part of this specification wherein like reference characters designate corresponding parts in the several views.

In the drawings:

FIGURE 1 is a perspective view of grass shears incorporating the grass catcher representing one embodiment of the present invention;

FIGURE 2 is a top plan view of the grass shears of FIGURE 1;

FIGURE 3 is a side elevational view of the grass shears of FIGURE 1;

FIGURE 4 is a partial bottom view of the grass shears of FIGURE 1 illustrating the means for mounting the grass catcher on the fixed blade of the grass shears;

FIGURE 5 is a top plan view of a portion of a grass catcher illustrating a modified mounting clip and;

FIGURE 6 is a perspective view of the FIGURE 5 embodiment mounted on the fixed blade of a grass shears.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the figures, it will be noted that a conventional grass shears 10 is illustrated. The shears 10 comprise a fixed upper handle 12 and a movable lower handle 14. The upper handle 12 has a downwardly extending channel-shaped portion 16. One end of the lower handle 14 is received within the channel portion 16 and is pivotally secured at 18 to the lower end thereof. Extending forwardly from the lower end of the channel portion 16 is a mounting flange 20. A fixed blade 22 is secured at its rearward end to the lower surface of the flange 20 by means of rivets 24.

A movable blade 26 is pivotally secured, at its rearward end, to the fixed blade 22. A stud 28 extends upwardly from the fixed blade 22 and extends through an opening in the movable blade 26. A nut 30 is threadingly received on the upper end of the stud 28 and a spring 32 is interposed between the nut 30 and the blade 26. The spring 32 biases the movable blade 26 against the fixed blade 22 to assure an efficient cutting action. It will be noted that the movable blade 26 is positioned above the fixed blade 22. The fixed blade 22 thus acts as a type of shield for the movable blade 26 to prevent the movable blade from cutting into the roots of the grass.

The movable blade 26 is actuated by the movable handle 14 through a linkage mechanism. As will be noted, a link 34 is secured intermediate its ends to a projection 36 on the movable handle 14 by means of a pin 38. The upper end of the link 34 is pivotally secured to a downwardly extending projection 40 of the fixed handle 12 by means of a pin 42. The opening through which the pin 38 projects is slightly larger than the pin, thus permitting some relative movement of the pin and link. The pin 38 is carried by the projection 36 in a path which is only slightly curved. The slight relative movement of the pin 38 link 34 permits pivoting of the link 34 about the pin 42 by the lower movable handle 14.

A stud 44 extends outwardly from the lower end of the link 34. A forwardly extending rod 46 is pivotally secured on the stud 44 by an eye 48 formed at the rearward end thereof and retained in place by a pin 49. The forward end of the rod 46 is threaded at 50 and threadingly received in an opening in upwardly extending flange 52 of an L-shaped bracket 54. A nut 56 is provided on the threaded portion 50 of the rod 46 to lock the bracket 54 and rod 46 together. Forwardly extending flange 58 of the bracket 54 is pivotally secured to the movable blade 26 adjacent the rearward end thereof by means of a rivet 60. The handles 12, 14 are normally biased apart by means of a coil spring 62.

It will thus be appreciated that movement of the handles 12, 14 together results in forward pivoting of the link 34. During such pivoting, the rod 46 moves forwardly, thus exerting a force on the rivet 60 to pivot the movable blade 26 toward the fixed blade 22 to perform the cutting action. Release of the handles 12, 14, through the agency of the spring 62, moves the handle 12, 14, apart with the result that the blades 22, 26, also pivot apart in readiness for the next cutting sequence.

Referring now to the grass catcher structure, it will be noted that the grass catcher 64 is an elongated member having a bottom wall 66 and an upwardly extending side wall 68. A curved front wall 70 inter-connected the bottom wall 66 and side wall 68 at the forward portions thereof. The grass catcher 64 is preferably molded from a relatively flexible plastic material, or can be a stamping made out of aluminum or other lightweight material.

As will be noted in the figures, the bottom wall 66 of the grass catcher 64 is located beneath the under surface of the fixed blade 22. The bottom wall 66 is wider than the fixed blade 22 and thus there is room in the catcher 64 adjacent the blade for the reception of grass. Both the bottom wall 66 and side wall 68 extend from a point beyond the rearward ends of the blades 22, 26 to a point forwardly of the tips of the blades. Thus, the grass catcher 64 entirely encompasses the blade to trap all of the grass which is cut by the blades.

The grass catcher 64 is secured to the fixed blade 22 by means of an adjustable clamp 72. The clamp 72 comprises two clamp halves 74, 76. Each of the clamp halves has an L-shape comprising downwardly extending legs 78, 80 and horizontally extending legs 82, 84. An inturned lip portion 86, 88 is formed at the outer end of each of the legs 82, 84.

The clamp half 74 is permanently affixed to the grass catcher bottom wall 66 at a point rearwardly thereof. Referring to FIGURE 4, it will be noted that the leg 82 of clamp half 74 is positioned on the upper surface of the bottom wall 66. The leg 78 extends through a slot in the bottom wall 66. Clamp half 74 is secured by means of rivets 90. The clamp half 76 is not permanently affixed to the grass catcher and is movable to permit attachment of the grass catcher to shears having different blade widths. As shown in FIGURE 4, a rectangular opening 92 is provided in the bottom wall 66 adjacent to clamp half 74. The leg 80 of the clamp half 76 extends through the opening 92. The clamp half 76 may thus move laterally with respect to the catcher bottom wall 66.

The catcher 64 is mounted on the fixed blade 22 by first positioning the clamp half 74 rearwardly of the cutting edges of the blades with the lip 86 in engagement with the outer edge of the fixed blade 22. A nut and bolt structure 94 is received in openings in the depending legs 78, 80 and is tightened to draw the clamp halves 74, 76 together. The lip 88 of the clamp half 76 ultimately engages the inner edge of the fixed blade 22 to firmly secure the grass catcher 64 to the blade 22.

Attention is directed to the fact that the bracket 72 is secured to the blade 22 at a point rearwardly of the cutting edges of the two blades. This is necessary in order that the bracket will not interfere with the cutting action of the blades. It should also be noted that the faces of the blades 22, 26 are spaced slightly apart at their rearward portions. Thus, the slight upward projection of lips 82, 88 does not interfere with blade action.

In use of the device, grass is edged in the normal manner. When the catcher 64 becomes loaded with cut grass, it is only necessary to flick the wrist toward the lawn to empty the catcher. In practice, emptying of the grass catcher 64 has a negligible effect on the speed with which the grass is cut and eliminates entirely the clean-up problem encountered with conventional edging shears.

FIGURES 5 and 6 illustrate a modification of the invention wherein the mounting clamp 96 is non-adjustable and is designed to fit a specific shear in which the lower fixed blade 98 is of uniform size.

The clamp 96 comprises a flat web portion 100 having upturned edge portions 102, 104 which are curved inwardly to form lips for engagement with the side edges 106, 108 of the blade 98. The clamp 96 is secured to the bottom wall 66 of the catcher 64 by rivets 110.

The edge portions 102, 104 of the clamp 96 are angled towards each other from the rear clamp end 112 to the front end 114. This matches the configuration of the blade 98. The clamp is secured to the blade 98 by forcing it thereon until a firm wedging is obtained at a point rearwardly of the blade cutting edges.

Having thus described my invention, I claim:

1. For use in combination with grass shears having a lower fixed blade and an upper movable blade, a portion of the fixed blade extending rearwardly of the blade cutting edges, a grass catcher having a bottom wall, a side wall and a front wall, the grass catcher being elongated for extending along the entire length of the lower fixed blade, a portion of the grass catcher bottom wall being receivable beneath the lower fixed blade, and an adjustable clamp lockingly engaged with the catcher bottom wall to prevent relative shifting of the clamp and catcher, said clamp having clamping structure extending upwardly from the catcher bottom wall and engagable with the side edges of the lower fixed blade at a point rearwardly of the blade cutting edges, said clamp including a pair of clamp halves, each of said clamp halves having a lip portion on the outer section thereof for engagement with the side edges of the lower fixed blade, one of said lamp halves being fixedly attached to the catcher bottom wall for preventing said relative shifting, the other of the clamp halves being movable with respect to the catcher bottom wall, fastening means extending between the clamp halves for drawing the clamp halves together in engagement with the side edges of the lower fixed blade.

2. For use in combination with grass shears having a lower fixed blade and an upper movable blade, a portion of the fixed blade extending rearwardly of the blade cutting edges, a grass catcher having a bottom wall, a side wall and a front wall, a portion of said bottom wall being receivable beneath the lower fixed blade, and an adjustable clamp comprising a pair of generally L-shaped clamp halves, each of said clamp halves comprising a first leg extending parallel with the catcher bottom wall and a second leg extending downwardly from the bottom wall, each of the first legs having a terminal lip portion on the outer edge thereof for engagement with the side edges of the lower fixed blade, one of said clamp halves being fixedly attached to the catcher bottom wall to positively prevent relative shifting of the clamp and grass catcher, the other of the clamp halves being movable with respect to the catcher bottom wall, fastening means extending between the second legs of the clamp halves for drawing the clamp halves together in engagement with the side edges of the lower fixed blade at a point rearwardly of the blade cutting edges.

References Cited by the Examiner

UNITED STATES PATENTS

| 2,325,734 | 8/43 | Bishop | 30—131 |
| 2,460,616 | 2/49 | Appleton | 30—131 |

FOREIGN PATENTS 323,161  12/29  Great Britain.

WILLIAM FELDMAN, *Primary Examiner.*

MILTON S. MEHR, *Examiner.*